United States Patent [19]

Renlund et al.

[11] Patent Number: 4,551,496

[45] Date of Patent: Nov. 5, 1985

[54] THERMOPLASTIC MOLDING OF SINTERABLE SILICON CARBIDE

[75] Inventors: Gary M. Renlund, Scotia; Curtis A. Johnson, Schenectady, both of N.Y.

[73] Assignee: General Electric Company, Schenectady, N.Y.

[21] Appl. No.: 599,031

[22] Filed: Apr. 11, 1984

[51] Int. Cl.$^4$ .......................... C04B 35/56; C08L 91/00
[52] U.S. Cl. ..................................... 524/322; 264/63; 501/90; 524/563
[58] Field of Search ................... 524/322, 563; 264/63; 501/90

[56] References Cited

U.S. PATENT DOCUMENTS

| | | | |
|---|---|---|---|
| 3,351,688 | 11/1967 | Kingery et al. | 264/63 |
| 4,000,110 | 12/1976 | Salto et al. | 260/42 |
| 4,004,934 | 1/1977 | Prochazka | 501/90 |
| 4,144,207 | 3/1979 | Ohnsorg | 524/322 |
| 4,151,135 | 4/1979 | McClain | 524/322 |
| 4,180,490 | 12/1979 | Maclean | 524/322 |
| 4,233,256 | 11/1980 | Ohnsorg | 264/44 |
| 4,434,258 | 2/1984 | Schumacher et al. | 524/322 |

OTHER PUBLICATIONS

"Rate-Controlled Extraction Unit for Removal of Organic Binders from Injection-Moulded Ceramics", Johnson et al., the Swedish Institute for Silicate Research (Before 1984), 6 pages.

"Rheological Properties of Highly Filled Polyolefin/Ceramic Systems Suited for Injection Molding", Litman et al., SPE Antec 22, pp. 549-551, (1976).

*Primary Examiner*—Mark L. Bell
*Attorney, Agent, or Firm*—Jane M. Binkowski; James C. Davis, Jr.; James Magee, Jr.

[57] ABSTRACT

A thermoplastically moldable ceramic composition comprised of from about 40% to about 60% by volume of a sinterable silicon carbide powder and a binder comprised of an organic acid and a copolymer of ethylene and from greater than about 12 weight % to about 33 weight % vinyl acetate, said organic acid having a melting point ranging from about 44° C. to about 88° C. and ranging from greater than about 18% by weight up to about 45% by weight of the binder. The ceramic composition is thermoplastically molded into a body which is baked to remove the binder and then sintered.

26 Claims, No Drawings

THERMOPLASTIC MOLDING OF SINTERABLE SILICON CARBIDE

The present invention is directed to thermoplastic molding of a sinterable silicon carbide composition. More particularly, it relates to a thermoplastic vehicle/binder for thermoplastically forming a sinterable silicon carbide particulate material into a shaped body.

The chemical and physical properties of silicon carbide make it an excellent material for low and high temperature structural applications. These properties include good oxidation resistance and corrosion behavior, high thermal conductivity, low thermal expansion coefficient, high thermal shock resistance and high strength at elevated temperature. This unique combination of properties suggests the use of silicon carbide as components for gas turbines, valve components for handling corrosive liquids and gases, linings of ball mills, heat exchangers and refractories for high temperature furnaces, pumps for die casting machines and combustion tubes.

U.S. Pat. No. 4,004,934, assigned to the assignee hereof and incorporated herein by reference, discloses the production of a sintered silicon carbide ceramic article by forming a dispersion of silicon carbide, a boron additive equivalent to about 0.3 to 3.0% by weight of boron, and elemental carbon or a carbonaceous additive in an amount equivalent to 0.1 to 1.0% by weight of elemental carbon, shaping the dispersion into a body, and sintering the body in an atmosphere chemically-inert with respect to a silicon carbide at or below atmospheric pressure at from about 1900° C. to about 2100° C. until the ceramic article has a density of at least 85% of theoretical.

U.S. Pat. No. 4,041,117, assigned to the assignee hereof and incorporated herein by reference, discloses the production of a silicon carbide sintered body by providing a particulate mixture composed of $\beta$-SiC and from 0.05% to 5% by weight of $\alpha$-SiC having a particle size of at least about twice as large as that of said $\beta$-SiC particles, an additive of boron or boron carbide equivalent to 0.3% to 3.0% by weight of boron and free carbon or a carbonaceous organic material equivalent to 0.1% to 1.0% by weight of free carbon, said carbonaceous organic material completely decomposing at from about 50° C. to 1000° C. to free carbon and gaseous products of decomposition, shaping the mixture into a green body, and sintering the green body at from about 1950° C. to 2300° C. in an atmosphere in which it is substantially inert at or below atmospheric pressure to produce a sintered body having a density of at least 80% of the theoretical density for silicon carbide and containing $\alpha$-SiC in an amount of at least 70% by weight.

U.S. Pat. Nos. 4,144,207 and 4,233,256 disclose forming a mixture of a sinterable silicon carbide material, a thermoplastic resin and an oil or a wax, injection molding the mixture to produce a molded product, removing said thermoplastic resin by baking said molded product at a temperature between about 450° C. and about 1000° C. to produce a porous baked product and sintering the baked product between about 2000° C. and 2200° C. to produce a sintered product.

Injection molding and other thermoplastic forming techniques of a ceramic powder such as extrusion, blow molding, compression molding, transfer molding, drawing, rolling, etc., places stringent requirements on the vehicle/binder selected. The thermoplastic medium selected must be suitable as a vehicle for the ceramic powder. A composite of the thermoplastic medium and ceramic powder can be formed into various shapes by a number of techniques. The vehicle must also behave as a binder maintaining the desired shape and be easily removed leaving behind a shaped powder compact. Binder removal is normally done by thermal decomposition.

A major problem with the vehicle/binder for the present silicon carbide sinterable composition has been that thermal decomposition of the binder from the shaped powder compact generally introduces defects such as cracks, pits and voids.

An object of the present invention is to provide a binder, i.e. a vehicle/binder system, suitable for fabrication of complex silicon carbide ceramic shapes by injection molding or other thermoplastic forming techniques.

A copolymer of ethylene and vinyl acetate was found to possess some properties which make it suitable as a binder/vehicle for the present silicon carbide composition. However, its removal was not possible in a reasonable time without resulting damage to the remaining powder compact. In the present invention, it was found that certain additions of stearic acid allowed binder removal without defects to the compact and with no serious compromise to the molding and release behavior of the ethylene-vinyl acetate copolymer.

Briefly stated, one embodiment of the present invention comprises a thermoplastically moldable ceramic composition comprising a substantially homogeneous dispersion comprising from about 40% by volume to about 60% by volume of a sinterable silicon carbide powder having an average particle size which is submicron and which consists essentially of silicon carbide, a boron additive selected from the group consisting of boron and boron carbide in an amount equivalent to from about 0.3% by weight to about 3% by weight of boron based on said silicon carbide, and an amount of a carbonaceous additive selected from the group consisting of free carbon, a carbonaceous organic material and mixtures thereof equivalent to from about 0.1% to about 5% by weight of free carbon based on said silicon carbide, said carbonaceous organic material completely decomposing at a temperature ranging from 50° C. up to 450° C. to said free carbon and gaseous product of decomposition, and from about 40% by volume to about 60% by volume of a binder consisting essentially of an organic acid containing from 12 to 26 carbon atoms per molecule and having a melting point ranging from about 44° C. to about 88° C. and a thermoplastic copolymer of ethylene and from greater than about 12 weight % to about 33 weight % vinyl acetate, said copolymer having a melt index according to ASTM D1238 ranging from about 8 to about 43, said organic acid ranging from greater than about 18% by weight up to about 45% by weight of the total weight of said binder.

Briefly stated, in another embodiment, the present invention comprises a process for producing a sintered polycrystalline silicon carbide body without significant defect which comprises forming a thermoplastically moldable ceramic composition comprising a substantially homogeneous dispersion comprising from about 40% by volume to about 60% by volume of a sinterable silicon carbide powder having an average particle size which is submicron and which consists essentially of silicon carbide, a boron additive selected from the group consisting of boron and boron carbide in an amount equivalent to from about 0.3% by weight to about 3% by weight of boron based on said silicon carbide, and an amount of a carbonaceous additive selected from the group consisting of free carbon, a carbonaceous organic material and mixtures thereof equivalent to from about 0.1% to about 5% by weight of free carbon based on said silicon carbide, said carbonaceous organic material completely decomposing at a temperature ranging from 50° C. up to 450° C. to said free carbon and gaseous product of decomposition, and the balance being a binder consisting essentially of an organic acid containing from 12 to 26 carbon atoms per molecule and having a melting point ranging from about 44° C. to about 88° C. and a thermoplastic copolymer of ethylene and from greater than about 12 weight % to about 33 weight % vinyl acetate, said copolymer having a melt index according to ASTM D1238 ranging from about 8 to about 43, said organic acid ranging from greater than about 18% by weight up to about 45% by weight of the total weight of said binder, thermoplastically molding said ceramic composition producing a molded body, embedding said molded body in an embedding powder, baking said embedded molded body at a heating rate which has no significant deleterious effect thereon at a temperature ranging up to 450° C. removing said binder leaving no amount therein which would have a significantly deleterious effect on said sintered body, said baking having no significant deleterious effect on said body, recovering the resulting baked body and sintering said baked body at a temperature ranging from about 1900° C. to about 2300° C. producing said sintered body having a density greater than 80% of the theoretical density for silicon carbide.

In the present invention, the thermoplastically moldable ceramic composition is comprised of a uniform or substantially uniform mixture, e.g. a homogeneous or substantially homogeneous dispersion, of the sinterable silicon carbide powder and binder. More specifically, the moldable ceramic composition contains the sinterable silicon carbide composition as a homogeneous or substantially homogeneous dispersion having an average particle size which is submicron and which is composed of silicon carbide and the boron and carbonaceous additives.

The present binder is a thermoplastic material which exhibits a very high viscosity at room temperature, and as a practical matter can be considered a solid at room temperature. Its viscosity decreases with increasing temperature. The binder is comprised of the present organic acid and a thermoplastic copolymer of ethylene and greater than about 12 weight % to about 33 weight % vinyl acetate.

The present copolymer also exhibits a very high viscosity at room temperature, and also, as a practical matter can be considered a solid at room temperature. The copolymer has a melt index according to ASTM D1238 ranging from about 8 to about 43, and preferably it ranges from about 12 to 30 and most preferably it is about 19. For a given molecular weight, the melt index of the present copolymer increases with increasing vinyl acetate concentration. An ethylene-vinyl acetate copolymer wherein the vinyl acetate content is about or below 12 weight % or higher than about 33 weight % is not useful since it will not produce, or it will be substantially more difficult to produce, the present sintered body free of service-limiting defects. Specifically, with decreasing vinyl acetate content in the copolymer, i.e. about or below 12 weight % of vinyl acetate, it becomes significantly increasingly difficult to produce the present substantially homogeneous dispersion as well as to produce a part without significant defects such as surface cracks. On the other hand, above about 33 weight % vinyl acetate, the copolymer is less viscous and it becomes substantially more difficult to remove the binder without creating significant defects such as bloating. Preferably, the present copolymer contains vinyl acetate in an amount of at least about 13 weight %, more preferably from about 14 weight % to about 30 weight %, most preferably from about 18 weight % to about 28 weight %, and particularly preferred is about 25 weight % vinyl acetate.

The present organic acid contains from 12 carbon atoms to 26 carbon atoms per molecule and has a melting point ranging from about 44° C. to about 88° C. Preferably, the organic acid is selected from the group consisting of lauric acid (melting point ∼44° C.), stearic acid (melting point ∼70° C.), cerotic acid (melting point ∼88° C.), and mixtures thereof, and most preferably it is stearic acid.

The present organic acid allows the binder during bake-out to be thermally decomposed in a reasonable time without sacrificing the beneficial molding properties of the copolymer. The useful range for the present organic acid is greater than about 18% by weight up to about 45% by weight of the total binder. With decreasing amounts of the organic acid, i.e. below and about 18% by weight of the organic acid, the binder will behave increasingly like the ethylene-vinyl acetate copolymer alone, i.e. it was found that the ethylene-vinyl acetate copolymer by itself would not thermally decompose during bake-out without leaving defects in the powder compact. On the other hand, with increasing amounts of organic acid, i.e. about and above 45% by weight of the organic acid, the binder will behave in an increasingly brittle manner like wax and is apt to leave, or will leave, service limiting defects consistent with low molecular weight binders. Preferably, the present organic acid is used in an amount ranging from about 20% by weight to about 40% by weight, most preferably from about 25% by weight to about 35% by weight, of the total amount of the binder.

The present sinterable silicon carbide powder is comprised of a homogeneous dispersion or at least a substantially homogeneous dispersion having an average particle size which is submicron, preferably having an average particle size which ranges from about 0.05 micron up to about 1 micron, and which consists essentially of silicon carbide, a boron additive selected from the group consisting of boron and boron carbide in an amount equivalent to from about 0.3% by weight to about 3% by weight of boron based on said silicon carbide, and an amount of a carbonaceous additive selected from the group consisting of free carbon, a carbonaceous organic material and mixtures thereof equivalent to from about 0.1% to about 5% by weight of free carbon based on said silicon carbide, said carbonaceous organic material completely decomposing at a temperature ranging from 50° C. up to 450° C. to said free carbon and gaseous product of decomposition.

The silicon carbide powder used in the present invention is α-silicon carbide, β-silicon carbide and mixtures thereof. Preferably, the oxygen content of the silicon carbide powder is less than about 0.4 weight %.

The boron additive is elemental boron, boron carbide or a mixture thereof. The amount of boron additive is equivalent to from about 0.3% to about 3.0% by weight of elemental boron, e.g. about 0.3 part by weight to about 3 parts by weight of elemental boron based on 100 parts by weight of silicon carbide. The particular amount of boron additive used is determinable empirically and depends largely on the degree of dispersion achieved in the mixture since the more thoroughly it is dispersed the more uniform is the density of the sintered product.

The carbonaceous additive is used in an amount equivalent to from about 0.1% by weight to about 5% by weight of free uncombined carbon, e.g. about 0.1 part by weight to about 5 parts by weight of free uncombined carbon based on 100 parts by weight of silicon carbide. Preferably, the carbonaceous additive is used in an amount equivalent to from about 0.1% by weight to about 2% by weight of free carbon, and most preferably from about 0.1% by weight to about 1% by weight of free carbon, based on silicon carbide. The particular amount of free carbon is determinable empirically and depends on such factors as the degree to which it is dispersed in the powder as well as the oxygen, $SiO_2$ and Si contents of the starting powder with which it reacts and the final density required in the sintered product.

Specifically, the carbonaceous additive can be particulate free carbon of submicron size such as, for example, acetylene black, and/or a carbonaceous organic material which is heat-decomposible to produce particulate free carbon of submicron size in the required amount. In addition, the carbonaceous organic material is a solid or liquid at room temperature and completely decomposes at a temperature in the range of 50° C. up to 450° C. to yield free carbon and gaseous products of decomposition. Also, the carbonaceous organic material is one which has no significant deleterious effect on the silicon carbide, boron additive or the resulting sintered product.

High molecular weight aromatic compounds are the preferred carbonaceous organic materials for making the carbon addition since they ordinarily give on pyrolysis the required yield of particulate free carbon of submicron size. Examples of such aromatic compounds are a phenolformaldehyde condensate-novolak which is soluble in acetone or higher alcohols, such as butyl alcohol, as well as many of the related condensation products, such as resorcinol-formaldehyde, aniline-formaldehyde, and cresol-formaldehyde. Another satisfactory group of compounds are derivatives of polynuclear aromatic hydrocarbons contained in coal tar, such as dibenzanthracene and chrysene. A preferred group of carbonaceous additives are polymers of aromatic hydrocarbons such as polyphenylene or polymethylphenylene which are soluble in aromatic hydrocarbons and yield on heat-decomposition up to 90% of free carbon.

If desired, free carbon in the form of a submicron powder can be admixed with the silicon carbide powder by a number of conventional techniques such as, for example, jet milling or ball milling in a liquid dispersion.

The carbonaceous organic material can be introduced by a number of techniques and heat-decomposed before or after the molded body, i.e. green body, is formed. If the carbonaceous organic material is a solid, it is preferably admixed in the form of a solution with the silicon carbide powder and boron additive to substantially coat the silicon carbide particles. The wet mixture can then be treated to remove the solvent, and the resulting dry mixture can be admixed with the binder to produce the present thermoplastically moldable ceramic mixture. In this way, a substantially uniform coating of the carbonaceous material on the silicon carbide powder is obtained which on decomposition produces a uniform distribution of free carbon. Or, if desired, the wet mixture can be heated to remove the solvent and decompose the carbonaceous organic material producing free carbon in situ before being admixed with the binder.

The binder is intimately mixed with the finely divided sinterable silicon carbide powder in a ratio that maintains the thermoplastic behavior of the binder but contains enough powder to form a self-supporting powder compact free of significant defect once the binder is removed. Specifically, the thermoplastically moldable ceramic composition is comprised of from about 40% by volume to about 60% by volume, and preferably about 50% by volume, of solids, i.e. the sinterable silicon carbide powder, and the balance is the present binder. An amount of solids less than about 40% by volume or higher than about 60% by volume is not operable to produce the present sintered body without significant defect.

The sinterable silicon carbide powder and the present binder can be admixed by a number of conventional techniques to produce the present thermoplastically moldable ceramic composition. Preferably, the sinterable silicon carbide powder and the binder are mixed at temperatures at which the present binder is molten, preferably at temperatures ranging from about 80° C. to about 180° C. Preferably, the resulting ceramic binder mixture is broken up into pieces to produce a more useful feed material.

A number of thermoplastic molding techniques can be used to produce the present molded body. Representative of such techniques are injection molding, extrusion, blow molding, compression molding, transfer molding, drawing and rolling.

To carry out the present thermoplastic molding, sufficient heat and pressure is applied to the ceramic composition to force it to flow to the desired degree depending on the particular thermoplastic molding process. The ceramic composition is heated to a temperature at which the binder is soft or molten depending upon the particular thermoplastic molding process. For most commercial thermoplastic forming techniques, the present ceramic composition is heated to make the binder molten at from about 80° C. to about 200° C., shaped under a pressure ranging from about 5 psi to about 30,000 psi depending upon the particular thermoplastic forming technique, and then allowed to cool and harden. For example, in the case of injection molding, the molten ceramic composition is forced into a die to produce the molded product. Specifically, for injection molding, the molten ceramic mixture, preferably at a temperature from about 130° C. to about 180° C. and under a pressure ranging from about 1000 psi to about 30,000 psi, is forced into a die where it is allowed to harden and then removed from the die. Preferably, the die is preheated to roughly from about 30° C. to about 60° C.

The resulting molded body is baked to remove the binder leaving no significant amount thereof, i.e. leaving no amount of binder which would have a significantly deleterious effect during the sintering of the body or on the sintered product. Generally, the present baking of the molded body leaves the binder in an amount of less than about 2% by weight and preferably less than about 1% by weight, of the baked body. The molded body is embedded, preferably immersed, in a supporting powder which prevents significant distortion of the body during baking to remove the binder. The embedding powder should have no significant deleterious effect on the body. An example of such a powder is charcoal. Preferably, the embedding powder is comprised of spherical or nominally spherical particles selected from the group consisting of sintered polycrystalline silicon carbide having a density greater than 80% of the theoretical density of silicon carbide, amorphous and/or crystalline free carbon-coated sintered polycrystalline silicon carbide wherein said carbon has a density greater than 80% of the theoretical density of graphite and wherein said polycrystalline silicon carbide has a density greater than 80% of the theoretical density of silicon carbide, amorphous and/or crystalline free carbon having a density greater than 80% of the theoretical density of graphite and mixtures thereof.

Baking of the embedded molded body is carried out under a vacuum or in an atmosphere which has no significant deleterious effect thereon, such as argon.

The molded body is baked at a heating rate or on a time-temperature schedule which removes the binder without imparting significant defect to the body up to a temperature of 450° C. During baking, the binder evaporates and/or thermally decomposes and is removed predominantly as a vapor. The baking should not introduce any significant defect, i.e. any service-limiting defect, such as, for example, cracks, voids and pits to the resulting baked and/or sintered body.

The allowable average heating rate or schedule to remove binder to produce parts without serious defect is dependent on the size, shape and especially the maximum cross-sectional thickness of the molded part. Faster average heating rates are acceptable for thinner parts, and slower average heating rates are necessary for thicker cross-sectional thicknesses. More specifically, the average heating rate to remove binder is inversely proportional or substantially inversely proportional to the maximum cross-sectional thickness of the molded piece. Therefore, for the range of useful products of commercial interest, the average heating rate to remove binder can range from about 0.1° C./hr to about 400° C./hr. As an example, the following conditions of binder removal are specific for a part with a maximum cross-sectional thickness of ~0.45 inches. The temperature is ramped from room temperature to 400° C. at ~4° C./hr., held at 400° C. for 24 hours and then furnace cooled to room temperature.

If desired, the baked body can be additionally heated to impart additional mechanical strength thereto. Such strength-imparting heating should have no significant deleterious effect on the body. Such strength-imparting heating can be carried out at a temperature higher than about 1000° C. at a heating rate which does not cause thermal shock, usually no greater than about 1000° C. per hour.

The baked body is recovered from the embedding powder and sintered. Sintering of the baked body is carried out in an atmosphere which has no significant deleterious effect on it such as, for example, argon, helium or a vacuum. The sintering atmosphere can be at about or below atmospheric pressure, i.e. it can range from a substantial vacuum to or about atmospheric pressure. The sintered product is a pressureless sintered product, i.e. no mechanical pressure is applied to the body being sintered to increase density.

Sintering is carried out at a temperature ranging from about 1900° C. to about 2300° C., and preferably from about 2000° C. to about 2100° C. The particular sintering temperature is determinable empirically and depends largely on particle size, density of the baked body, and final density desired in the sintered product with higher final densities requiring higher sintering temperatures. For example, the smaller the size of the particles in the green baked body, the lower is the required sintering temperature.

The sintered body has a density higher than 80%, preferably higher than about 90% and most preferably it is at least about 95% or higher of the theoretical density of silicon carbide and is comprised of silicon carbide, i.e. $\alpha$-SiC, $\beta$-SiC and mixtures thereof, and from about 0.3 part by weight to about 3 parts by weight of boron, based on 100 parts by weight of silicon carbide. The sintered body can be free of detectable free carbon but frequently it contains from less than about 0.1 part to less than about 5 parts by weight of free carbon based on 100 parts by weight of silicon carbide substantially uniformly dispersed throughout the sintered body.

The present invention makes it possible to fabricate complex and/or hollow shaped articles of polycrystalline silicon carbide as well as simple shaped articles. Thus, articles such as gas turbine air foils, crucibles, thin-walled hollow tubes, long rods, spherical bodies and nozzles can be produced directly by the present invention.

Ser. No. 599,032, now U.S. Pat. No. 4,530,808 "BINDER REMOVAL FROM THERMOPLASTICALLY FORMED SiC ARTICLE" filed for G. M. Renlund and C. A. Johnson on even data herewith and assigned to the assignee hereof and incorporated herein by reference discloses a method of producing a sintered silicon carbide body which comprises forming a thermoplastically moldable ceramic composition comprised of sinterable silicon carbide powder and binder, thermoplastically molding the ceramic composition into a body, embedding the body in nominally spherical particles selected from the group consisting of polycrystalline silicon carbide, carbon-coated polycrystalline silicon carbide, dense free carbon and mixtures thereof, baking the embedded body to remove the binder therefrom, recovering the baked body and sintering the baked body.

Ser. No. 599,033 "FABRICATION OF SMALL DENSE SILICON CARBIDE SPHERES" filed for C. A. Johnson, G. M. Renlund, C. E. VanBuren and S. Prochazka on even date herewith and assigned to the assignee hereof and incorporated herein by reference discloses the production of small dense silicon carbide spheres ranging in average diameter from about 10 microns to 5000 microns by spray drying or tumbling a sinterable silicon carbide powder producing spherical agglomerates thereof and sintering the agglomerates.

The preferred present embedding particles of spherical or nominally spherical polycrystalline silicon carbide and carbon coated polycrystalline silicon carbide are produced according to the disclosure of Ser. No. 599,032 and Ser. No. 599,033.

Ser. No. 599,034, "THERMOPLASTIC MOLDING OF CERAMIC POWDER" filed for G. M. Renlund and C. A. Johnson on even date herewith and assigned to the assignee hereof and incorporated herein by reference discloses the production of a thermoplastically moldable ceramic composition comprised of from about 40% to about 60% by volume of a ceramic powder and a binder comprised of an organic acid and a copolymer of ethylene and from greater than about 12 weight % to about 33 weight % vinyl acetate, said organic acid having a melting point ranging from about 44° C. to about 88° C. and ranging from greater than about 18% by weight up to about 45% by weight of the binder. The ceramic composition is thermoplastically molded into a body which is baked to remove the binder and then densified to produce a polycrystalline body having a porosity of less than about 20% by volume.

The invention is further illustrated by the following Examples which, unless otherwise noted, were carried out as follows:

The melt index was according to ASTM D-1238.

The sinterable silicon carbide powder was a substantially homogeneous dispersion, i.e. mixture, with an average particle size which was submicron and which was comprised of $\beta$-silicon carbide, free uncombined carbon in an amount of about 1.0% by weight of the silicon carbide and elemental boron in an amount of about 0.5% by weight of the silicon carbide. The powder contained less than about 0.4% by weight of oxygen.

EXAMPLE 1

The binder was comprised of stearic acid and a thermoplastic copolymer of ethylene and 25 weight % vinyl acetate. The copolymer was sold under the trademark "Elvax 350", had a melt index of 19 and softened at about 90° C. The stearic acid was present in an amount of 30% by weight of the total amount of binder.

Fifty volume % of the sinterable silicon carbide powder was admixed with 50 volume % of the binder to produce a substantially homogeneous mixture. Specifically, the sinterable silicon carbide powder along with the stearic acid and ethylene-vinyl acetate copolymer were mixed in a Sigma-blade mixer at ambient pressure for about an hour at a temperature of roughly about 120° C. to about 140° C. and then continued mixing for about 10 minutes under a vacuum of approximately 29 inches of Hg to remove air bubbles therefrom producing a substantially homogeneous mixture. The resulting mixture was placed on a sheet of aluminum foil, chopped into pieces, and allowed to cool to room temperature.

The chopped mixture, i.e. thermoplastically moldable ceramic composition, was a substantially homogeneous mixture of the binder and sinterable silicon carbide powder. It was injection molded in a 100 ton injection molding press. The press was provided with a barrel and nozzle for heating the material and a sprue bushing through which the hot thermoplastic material was passed into a die shaped to give a molded part in the form of a rotor of complex shape weighing about 150 grams. The barrel and nozzle were preheated to 130° C., the sprue bushing was preheated to 70° C. and the die was preheated to 50° C.

The mixture was placed in the barrel where it was heated for about 15 minutes until it reached uniform temperature. The resulting molten mixture was then forced under pressure through the sprue bushing into the die filling the die where its residence time was about 3 minutes allowing it to solidify. The injection molding pressure ranged up to about 10,000 psi. The resulting molded body was removed from the die. It had a maximum cross-sectional thickness of ~0.65 inch.

The molded body appeared free of visual defects. It was totally immersed in an embedding powder comprised of spherical or nominally spherical particles of sintered polycrystalline silicon carbide which had an average diameter of approximately 50 microns and a density greater than 90% of the theoretical density for silicon carbide. The spherical particles were comprised of silicon carbide, about 0.5% by weight boron and about 1.0% by weight free carbon, based on silicon carbide. The embedding particles were produced according to the disclosure of Ser. No. 599,033 filed on even date herewith for "FABRICATION OF SMALL DENSE SiC SPHERES" by forming spray dried spherical or nominally spherical agglomerates containing $\beta$-SiC, about 0.5% by weight boron and about 1.0% by weight free carbon, based on silicon carbide, and sintering in $\frac{1}{2}$ atmosphere helium at about 280° C.

The resulting embedded structure was baked under a vacuum ranging from about 5 millitorr to about 100 millitorr at a heating rate of 1° C. per hour to about 400° C., held at about 400° C. for 24 hours and then furnace-cooled to about room temperature. The resulting baked body was recovered from the embedding powder and appeared free of defects.

The baked body was sintered in an atmosphere comprised of about $\frac{1}{2}$ atmosphere of helium at about 2080° C. for 30 minutes and then furnace-cooled to room temperature. The sintered body had a density greater than 95% of the theoretical density for silicon carbide and had a substantially uniform small grained microstructure. The sintered body appeared free of defects and would be useful as a rotor.

EXAMPLE 2

This example was carried out in substantially the same manner as disclosed for Example 1 except that the sinterable silicon carbide powder along with the stearic acid and ethylene-vinyl acetate copolymer were placed in a one liter bowl and mixed at ambient pressure in a Haake mixer with cam rotors at approximately 110° C. for approximately 15 minutes. The resulting hot mixture was transferred to a one quart Sigma-blade mixer and mixed at roughly 90° C. for about 10 minutes at ambient pressure and then continued mixing for about ten minutes under a vacuum of roughly about 29 inches Hg to remove air bubbles therefrom producing a substantially homogeneous mixture.

In this example, the barrel and nozzle of the injection molding press were preheated to 180° C. The resulting molded body was immersed in the embedding powder and was heated at a rate of 1° C. per hour to about 400° C., held at about 400° C. for 24 hours, then heated at 10° C. per hour to about 500° C. and then it was furnace-cooled to room temperature.

The resulting sintered body had a density greater than 95% of the theoretical density for silicon carbide and had a substantially uniform small grained microstructure. The sintered body appeared free of defects and would be useful as a rotor.

EXAMPLE 3

This example was carried out in substantially the same manner as disclosed for Example 2, except that the ethylene-vinyl acetate copolymer contained 12 weight % vinyl acetate. This copolymer was sold under the trademark "Elvax 650."

Some surface cracks were seen in the baked body. The resulting sintered body showed the same surface cracks seen in the baked body but no additional defects were visible.

Based on other experiments and past experience, it was determined that these surface cracks were due to the complex shape of the part and its relatively large size, and that a higher molding pressure and/or temperature, or an ethylene-vinyl acetate copolymer containing more than 12 weight % vinyl acetate, would have produced a baked and sintered part free of these surface cracks, i.e. free of any significant defect.

EXAMPLE 4

The binder was comprised of a copolymer of ethylene and 25 weight % vinyl acetate and had a melt index of 19 and stearic acid in an amount of 30% by weight of the total amount of binder.

55 volume % of the sinterable silicon carbide powder was admixed with 45 volume % of the binder producing a substantially homogeneous mixture. Specifically, the sinterable silicon carbide powder along with the stearic acid and ethylene-vinyl acetate copolymer were mixed in a Sigma-blade mixer at roughly about 120° C. to about 140° C. at ambient pressure for about 10 minutes and then continued mixing for about 10 minutes under a vacuum of approximately 29 inches of Hg to remove bubbles therefrom producing a substantially homogeneous mixture.

The resulting mixture was placed on a sheet of aluminum foil, chopped into pieces, and allowed to cool to room temperature.

The chopped mixture, i.e. thermoplastically moldable ceramic composition, was a substantially homogeneous mixture of the binder and sinterable silicon carbide powder. It was injection molded in an injection molding press which was of substantially the same type as disclosed in Example 1, except that it was smaller and produced a molded part in the form of a turbine blade weighing about 10 grams. The barrel and nozzle were preheated to 160° C., and the die was preheated to about 50° C.

The mixture was placed in the barrel where it was heated for about 15 minutes until it reached uniform temperature. The resulting molten mixture was then forced under a pressure through the sprue bushing into the die filling the die where its residence time was a few minutes, long enough to allow it to solidify. The injection molding pressure ranged up to about 6,000 psi. The resulting molded body was removed from the die. It had a maximum cross-sectional segment of about 0.35 inches.

The molded body appeared free of visual defects. It was totally immersed in an embedding powder comprised of 50-200 mesh coconut charcoal. The resulting structure was baked under a vacuum ranging from about 5 millitorr to about 100 millitorr at a heating rate of 4° C. per hour to about 400° C., held 24 hours at about 400° C., and then furnace-cooled to about room temperature. The resulting baked body was recovered from the embedding powder and did not show any significant defects.

The baked body was sintered in an atmosphere comprised of about ½ atmosphere of helium at about 2080° C. for 30 minutes and then furnace-cooled to room temperature. The sintered body had a density of greater than 95% of the theoretical density for silicon carbide and had a substantially uniform small-grained microstructure.

The sintered body appeared free of defect and would be useful for high temperature structural applications such as gas turbine blades.

EXAMPLE 5

This example was carried out in substantially the same manner as disclosed for Example 4 except that 45% by weight stearic acid was used.

The baked body exhibited some small surface cracks. The resulting sintered body had a density greater than 95% of theoretical density and showed the same small surface cracks as in the baked body, but no additional defects were visible. Based on other experiments and past experience, it was determined that an amount of stearic acid less than about 45% by weight would have produced a sintered body free of the observed surface cracks, i.e. a sintered body with no significant defect.

EXAMPLE 6

This example was carried out in substantially the same manner as disclosed for Example 4 except that 18% by weight stearic acid was used.

No visible defects were seen in the molded body but the baked body exhibited some small bubbles.

The resulting sintered body showed the same bubbles but no additional defects were seen. Based on other experiments and past experience, the small bubbles seen in the baked and sintered bodies indicated that an amount of stearic acid greater than about 18% by weight would have produced a baked body as well as a sintered body which would have been free of such bubbles, i.e. which would have no significant defects.

Examples 7, 8 and 9 were carried out in substantially the same manner as disclosed for Example 4 except as indicated herein and in Table I.

In Example 8, the polyisobutene was a thermoplastic polymer with an average molecular weight of 100,000 and a volatization temperature lower than 450° C.

In Example 9, the binder was comprised of a wax composition comprised of 30.3% by wt P-21 wax (melting point 53°–57° C.), 30.3% by wt P-22 wax (melting point ~63° C.), 30.3% by wt ceresin (melting point 73°–78° C.), 5.0% by wt oleic acid and 4.1% by wt aluminum stearate. In Example 9, mixing was carried out by mechanically stirring the binder components for a few hours above their melting point and then mixing the resulting binder with the sinterable silicon carbide powder in a Sigma-blade mixer at about 100° C. under a vacuum of about 29 inches of Hg for about 10 minutes.

The binders of Examples 7 and 9 caused the production of sintered bodies which were not useful.

The binder of Example 8 produced a baked body with internal voids which was useless and which would have resulted in a useless sintered product.

The examples are illustrated in Table I where Examples 1, 2 and 4 of Table I illustrate the present invention.

TABLLE 1

| | Molding | |
|---|---|---|
| | Nozzle | |

TABLE 1-continued

| Example | Binder | Part | Molding Solids Loading | Pressure (psi) | and Barrel Temp. | Condition of Molded Body |
|---|---|---|---|---|---|---|
| 1 | Polyethylene - 25 w/o vinyl acetate copolymer, melt index = 19, plus 30 w/o stearic acid | Rotor ~150 grams | 50 v/o solids | 10,000 | ~130° C. | No observed defects |
| 2 | Polyethylene - 25 w/o vinyl acetate copolymer, melt index = 19, plus 30 w/o stearic acid | Rotor ~150 grams | 50 v/o solids | 10,000 | ~180° C. | No defects seen |
| 3 | Polyethylene - 12 w/o vinyl acetate copolymer, melt index = 8.0, plus 30 w/o stearic acid | Rotor ~150 grams | 50 v/o solids | 10,000 | ~180° C. | No defects seen |
| 4 | Polyethylene - 25 w/o vinyl acetate copolymer, melt index = 19, plus 30 w/o stearic acid | Turbine blade ~10 grams | 55 v/o solids | 6,000 | ~160° C. | No observed defects |
| 5 | Polyethylene - 25 w/o vinyl acetate copolymer, melt index = 19, plus 45 w/o stearic acid | Turbine blade ~10 grams | 55 v/o solids | 6,000 | ~160° C. | No observed defects |
| 6 | Polyethylene - 25 w/o vinyl acetate copolymer, melt index = 19, plus 18 w/o stearic acid | Turbine blade ~10 grams | 55 v/o solids | 6,000 | ~160° C. | No observed defects |
| 7 | Polyethylene - 25 w/o vinyl acetate copolymer, melt index = 19, plus 5 w/o stearic acid | Turbine blade ~10 grams | 55 v/o solids | 6,000 | ~160° C. | No observed defects |
| 8 | Polyisobutene plus 30 w/o stearic acid | Turbine blade ~10 grams | 55 v/o solids | 6,000 | ~160° C. | Poor mechanical properties/difficult to remove part from die |
| 9 | P21 wax, P22 wax, ceresine, oleic acid, aluminum stearate | Turbine blade ~10 grams | 55 v/o solids | 6,000 | ~85° C. | No defects seen |

| Example | Binder Removal Embedding Powder | Heating Schedule | Condition of Baked Body | Sintering Temp. | Time/Atm | Sintered Body Condition |
|---|---|---|---|---|---|---|
| 1 | SiC spheres | 1° C./hr to ~400° C. & held 24 hrs. at ~400° C. | No observed defects | ~2080° C. | 30 min in ½ atm He | No observed defects |
| 2 | SiC spheres | 1° C./hr to ~400° C. held 24 hrs at ~400° C., then 10° C./hr to ~500° C. | No defects seen | ~2080° C. | 30 min in ½ atm He | No observed defects that should affect performance |
| 3 | SiC spheres | 1° C./hr to ~400° C. held 24 hrs at ~400° C., then 10° C./hr to ~500° C. | Surface cracks | ~2080° C. | 30 min in ½ atm He | No additional defects seen |
| 4 | Charcoal | 4° C./hr to ~400° C. & held 24 hrs at ~400° C. | No observed defects | ~2080° C. | 30 min in ½ atm He | No observed defects that should affect performance |
| 5 | Charcoal | 4° C./hr to ~400° C. & held 24 hrs at ~400° C. | Some small surface cracks | ~2080° C. | 30 min in ½ atm He | No additional defects seen |
| 6 | Charcoal | 4° C./hr to ~400° C. & held 24 hrs at ~400° C. | Some small bubbles in part | ~2080° C. | 30 min in ½ atm He | No additional defects seen |
| 7 | Charcoal | 4° C./hr to ~400° C. & held 24 hrs at ~400° C. | Large degree of bloating & bubble formation | ~2080° C. | 30 min in ½ atm He | No additional defects seen |
| 8 | Charcoal | 4° C./hr to ~400° C. & held 24 hrs at ~400° C. | Internal voids seen | Not Sintered | | |
| 9 | Charcoal | 4° C./hr to ~250° C. & held 24 hrs at ~250° C. | Small surface cracks | ~2080° C. | 30 min in ½ atm He | No additional defects seen |

EXAMPLE 10

This example illustrates extrusion molding.

The chopped thermoplastically moldable ceramic composition was the same as disclosed in Example 1.

Conventional extrusion molding equipment was used which was preheated to a temperature of about 90° C. to 100° C.

The present thermoplastic ceramic composition was extruded into the form of a solid rod about 0.15 inch in diameter and about 11 inches long.

To carry out the baking, a supporting graphite substrate with an open groove therein for supporting the rod was used. The preform, i.e. molded rod was positioned in the groove, covered with 50-200 mesh coconut charcoal and baked under substantially the same conditions as disclosed in Example 4.

The charcoal was then removed, and the baked rod supported in the groove of the graphite substrate was sintered in substantially the same manner as disclosed in Example 4.

The resulting sintered rod had a density greater than 95% of the theoretical density for silicon carbide and appeared free of defects.

EXAMPLE 11

The procedure and materials used in this Example were the same as disclosed in Example 10 except that the thermoplastic molding composition was extruded into a preform which was a hollow tube about 5 inches long with about a ½ inch inner diameter and about a ⅝ inch outer diameter.

The resulting hollow sintered tube had a density greater than 95% of the theoretical density for silicon carbide and appeared free of defects.

EXAMPLE 12

This example illustrates blow molding.

An extruded preform was produced as disclosed in Example 11, i.e. a hollow tube about 5 inches long with about a ½ inch inner diameter and about ⅝ inch outer diameter.

The central portion of the preform was positioned within a glass tube which had an inner diameter of about one inch. A clamp was placed around the outer diameter of one end of the preform which closed that end to air flow. A second clamp was placed around the outer diameter of the opposite end of the preform which left that end open to air flow. Both clamps prevented expansion of the end portions of the preform.

The preform was heated in air to about 80° C. to 100° C. Compressed nitrogen, roughly 5 to 10 psi gauge, was forced through the end of the hot preform open to air flow causing the central portion of the preform to expand and such expansion was limited by the supporting glass tube.

The compressed nitrogen was then removed, the preform cooled to ambient temperature, the clamps were then removed and the preform was removed from the glass tube.

The resulting blow molded preform was baked under substantially the same conditions set forth in Example 4. The resulting baked body was sintered in substantially the same manner as disclosed in Example 1. The resulting hollow sintered tube had a density greater than 95% of the theoretical density for silicon carbide and its central portion had a diameter significantly larger than its outer open end portions.

EXAMPLE 13

This example illustrates roll-forming of the present thermoplastically moldable ceramic composition into the form of a sheet. The roll-forming equipment was conventional equipment used in the plastics industry for forming sheet.

The thermoplastically moldable ceramic composition was the same as disclosed in Example 1.

The rolls were made of steel, set with an approximately 0.005 to 0.010 inch gap therebetween and preheated to about 100° C.

The present thermoplastic ceramic composition was rolled through the gap producing a molded sheet ranging from about 0.005 to about 0.010 inches in thickness.

The molded sheet was immersed in 50-200 mesh charcoal powder and baked in substantially the same manner as disclosed in Example 4.

The baked sheet was recovered and sintered in substantially the same manner as disclosed in Example 1.

The resulting sheet had a density greater than 95% of the theoretical density for silicon carbide and would be useful as substrates.

What is claimed is:

1. A thermoplastically moldable ceramic composition consisting essentially of a substantially homogeneous dispersion consisting essentially of from about 40% by volume to about 60% by volume of a sinterable silicon carbide powder having an average particle size which is submicron and which consists essentially of silicon carbide, a boron additive selected from the group consisting of boron and boron carbide in an amount equivalent to from about 0.3% by weight to about 3% by weight of boron based on said silicon carbide, and an amount of a carbonaceous additive selected from the group consisting of free carbon, a carbonaceous organic material and mixtures thereof equivalent to from about 0.1% to about 5% by weight of free carbon based on said silicon carbide, said carbonaceous organic material completely decomposing at a temperature ranging from 50° C. up to 450° C. to said free carbon and gaseous product of decomposition, and from about 40% by volume to about 60% by volume of a binder consisting essentially of an organic acid containing from 12 to 26 carbon atoms per molecule and having a melting point ranging from about 44° C. to about 88° C. and a thermoplastic copolymer of ethylene and from greater than about 12 weight % to about 33 weight % vinyl acetate, said copolymer having a melt index ranging from about 8 to about 43, said organic acid ranging from greater than about 18% by weight up to about 45% by weight of the total weight of said binder.

2. The ceramic composition of claim 1 wherein said organic acid is stearic acid.

3. The ceramic composition of claim 1 wherein said vinyl acetate is present in an amount of about 25 weight % and wherein said copolymer has a melt index of about 19.

4. The ceramic composition of claim 1 wherein said vinyl acetate is present in an amount of about 25 weight % and wherein said copolymer has a melt index of about 19, and said organic acid is stearic acid present in an amount of about 30% by weight of said binder.

5. The ceramic composition of claim 1 wherein said sinterable silicon carbide powder is present in an amount of about 50% by volume.

6. A process for producing a sintered polycrystalline silicon carbide body which consists essentially of forming a thermoplastically moldable ceramic composition consisting essentially of a substantially homogeneous dispersion consisting essentially of from about 40% by volume to about 60% by volume of a sinterable silicon carbide powder having an average particle size which is submicron and which consists essentially of silicon carbide, a boron additive selected from the group consisting of boron and boron carbide in an amount equivalent to from about 0.3% by weight to about 3% by weight of boron based on said silicon carbide, and an amount of a carbonaceous additive selected from the group consisting of free carbon, a carbonaceous organic material and mixtures thereof equivalent to from about 0.1% by weight to about 5% by weight of free carbon based on silicon carbide, said carbonaceous organic material completely decomposing at a temperature ranging from 50° C. up to 450° C. to said free carbon and gaseous product of decomposition, and the balance being a binder consisting essentially of an organic acid containing from 12 to 26 carbon atoms per molecule and having a melting point ranging from about 44° C. to about 88° C. and a thermoplastic copolymer of ethylene and from greater than about 12 weight % to about 33 weight % vinyl acetate, said copolymer having a melt index ranging from about 8 to about 43, said organic acid ranging from greater than about 18% by weight up to about 45% by weight of the total weight of said binder, thermoplastically molding said ceramic composition producing a molded body, embedding said molded body in an embedding powder, baking said embedded molded body at a heating rate which has no significant deleterious effect thereon at a temperature ranging up to 450° C. removing said binder leaving no amount therein which would have a significantly deleterious effect on said sintered body, said baking having no significant deleterious effect on said body, said embedding powder having no significantly deleterious effect on said body and being a supporting powder which prevents significant distortion of the body during said baking to remove said binder, recovering the resulting baked body and sintering said baked body at a temperature ranging from about 1900° C. to about 2300° C. producing said sintered body having a density greater than 80% of the theoretical density for silicon carbide.

7. The process according to claim 6 wherein said organic acid is stearic acid.

8. The process according to claim 6 wherein said vinyl acetate is present in an amount of about 25 weight % and wherein said copolymer has a melt index of about 19.

9. The process according to claim 6 wherein said vinyl acetate is present in an amount of about 25 weight % and wherein said copolymer has a melt index of about 19, and said organic acid is stearic acid present in an amount of about 30% by weight of said binder.

10. The process according to claim 6 wherein said sinterable silicon carbide powder is present in an amount of about 50% by volume.

11. The process according to claim 6 wherein said embedding of said molded body in said embedding powder consists essentially of totally immersing said molded body in said embedding powder.

12. The process according to claim 6 wherein said embedding powder consists essentially of spherical or nominally spherical particles having a density greater than 80% of the theoretical density for said particles and being selected from the group consisting of polycrystalline silicon carbide, free carbon-coated polycrystalline silicon carbide, free carbon and mixtures thereof.

13. The process according to claim 6 wherein said thermoplastically molding is injection molding.

14. The process according to claim 6 wherein said thermoplastically molding is blow molding.

15. The process according to claim 6 wherein said thermoplastically molding is extrusion molding.

16. The process according to claim 6 wherein said thermoplastically molding is roll forming.

17. A blow-molded hollow polycrystalline ceramic body having a density greater than 80% of the theoretical density of silicon carbide consisting essentially of silicon carbide, from about 0.3 part by weight to about 3 parts by weight of boron based on 100 parts by weight of silicon carbide and up to about 5 parts by weight of free carbon based on 100 parts by weight of silicon carbide.

18. A process for producing a thermoplastically molded silicon carbide body which consists essentially of forming a thermoplastically moldable ceramic composition consisting essentially of a substantially homogeneous dispersion consisting essentially of from about 40% by volume to about 60% by volume of a sinterable silicon carbide powder having an average particle size which is submicron and which consists essentially of silicon carbide, a boron additive selected from the group consisting of boron and boron carbide in an amount equivalent to from bout 0.3% by weight to about 3% by weight of boron based on said silicon carbide, and an amount of a carbonaceous additive selected from the group consisting of free carbon, a carbonaceous organic material and mixtures thereof equivalent to from about 0.1% by weight to about 5% by weight of free carbon based on said silicon carbide, said carbonaceous organic material completely decomposing at a temperature ranging from 50° C. up to 450° C. to said free carbon and gaseous product of decomposition, and the balance being a binder consisting essentially of an organic acid containing from 12 to 26 carbon atoms per molecule and having a melting point ranging from about 44° C. to about 88° C. and a thermoplastic copolymer of ethylene and from greater than about 12 weight % to about 33 weight % vinyl acetate, said copolymer having a melt index ranging from about 8 to about 43, said organic acid ranging from greater than about 18% by weight up to about 45% by weight of the total weight of said binder, and thermoplastically molding said ceramic composition producing a molded body.

19. The process according to claim 18 wherein said organic acid is stearic acid.

20. The process according to claim 18 wherein said vinly acetate is present in an amount of about 25% by weight and wherein said copolymer has a melt index of about 19.

21. The process according to claim 18 wherein said vinly acetate is present in an amount of about 25% by weight and wherein said copolymer has a melt index of about 19, and said organic acid is stearic acid present in an amount of about 30% by weight of said binder.

22. The process according to claim 18 wherein said sinterable silicon carbide powder is present in an amount of about 50% by volume.

23. The process according to claim 18 wherein said thermoplastically molding is injection molding.

24. The process according to claim 18 wherein said thermoplastically molding is blow molding.

25. The process according to claim 18 wherein said thermoplastically molding is extrusion molding.

26. The process according to claim 18 wherein said thermoplastically molding is roll forming.

* * * * *